US012341306B2

(12) United States Patent
Flores Becerril et al.

(10) Patent No.: US 12,341,306 B2
(45) Date of Patent: Jun. 24, 2025

(54) COVERLESS INTERCHANGEABLE AC POWER OUTLETS

(71) Applicant: FORD GLOBAL TECHNOLOGIES, LLC, Dearborn, MI (US)

(72) Inventors: Ailen Flores Becerril, Toluca de Lerdo (MX); Rosa Fabiola Benitez Torres, Atizapán de Zaragoza (MX); Silvia López Portela, Mexico City (MX); Maria Alejandra Cobos Reyes, Mexico City (MX); Eduardo Arturo Aguilar Ruelas, Mexico City (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 321 days.

(21) Appl. No.: 18/140,003

(22) Filed: Apr. 27, 2023

(65) Prior Publication Data

US 2023/0387638 A1 Nov. 30, 2023

Related U.S. Application Data

(60) Provisional application No. 63/345,180, filed on May 24, 2022.

(51) Int. Cl.

*H01R 27/00* (2006.01)
*H01R 13/447* (2006.01)
*H01R 13/717* (2006.01)

(52) U.S. Cl.

CPC ........... *H01R 27/00* (2013.01); *H01R 13/447* (2013.01); *H01R 13/7175* (2013.01); *H01R 2201/26* (2013.01)

(58) Field of Classification Search

None

See application file for complete search history.

(56) References Cited

U.S. PATENT DOCUMENTS

| | | | | |
|---|---|---|---|---|
| 4,386,333 | A * | 5/1983 | Dillan | H01F 29/00 439/43 |
| 9,093,773 | B2 | 7/2015 | Pietila et al. | |
| 10,211,583 | B2 | 2/2019 | Liao | |
| 10,418,768 | B1 * | 9/2019 | Xiao | H01R 35/04 |
| 10,559,916 | B1 * | 2/2020 | Lo | H01R 31/06 |
| 10,840,657 | B1 | 11/2020 | Aguilar Ruelas et al. | |
| 2006/0281349 | A1 * | 12/2006 | Chong | H01R 35/04 439/131 |
| 2014/0259651 | A1 * | 9/2014 | Fletcher | H01R 13/71 29/825 |
| 2019/0044295 | A1 * | 2/2019 | Wei | H01R 35/04 |
| 2024/0022032 | A1 * | 1/2024 | López Portela | H01R 13/447 |

FOREIGN PATENT DOCUMENTS

| | | |
|---|---|---|
| KR | 20170061956 A | 6/2017 |

* cited by examiner

*Primary Examiner* — Tho D Ta

(74) *Attorney, Agent, or Firm* — Frank L. Lollo; MacMillan, Sobanski & Todd, LLC

(57) ABSTRACT

A coverless AC power outlet for use in a vehicle interior has a pivotable faceplate that covers or exposes power terminals for receiving prongs of an AC power plug. Internal terminals of the outlet are packaged in a cylinder which is interchangeable between a plurality of plug styles used in different regions of the world. Surrounding the faceplate, a ring of light indicates status of activated or nonactivated terminals.

15 Claims, 11 Drawing Sheets

COVERLESS INTERCHANGEABLE AC POWER OUTLETS

CROSS REFERENCE TO RELATED APPLICATIONS

This application claims the benefit of U.S. Provisional Application Ser. No. 63/345,180, filed May 24, 2022, entitled "Coverless Interchangeable AC Power Outlets," which is incorporated herein by reference in its entirety.

STATEMENT REGARDING FEDERALLY SPONSORED RESEARCH

Not Applicable.

BACKGROUND OF THE INVENTION

The present invention relates in general to power outlets in passenger vehicles, and, more specifically, to an outlet for an AC power inverter incorporating a position-controlled switch and easily adaptable for use with different types of power plugs and sockets.

Passenger vehicles such as cars, trucks, and busses have traditionally provided DC power outlets in their passenger cabins for use with various electrical accessories. Even with the addition of USB outlets for mobile electronics, the voltage and power level of outlets is low. In order to expand the kinds of devices which can be powered in the vehicle, DC-to-AC power inverters are often provided in vehicles with corresponding power outlets provided in the passenger cabin. Power delivery from AC inverters may include 150 W, 400 W, 2 KW 2.3 KW, 2.4 KW, and as much as 7.2 KW. A cover may typically be provided over the AC outlet when not in use. However, a cover takes up additional space and may be inconvenient.

Mounting locations for AC power outlets in the interiors of automotive vehicles (e.g., cars and trucks) typically include trim panels such as a center console or a dashboard. Typically, the power outlet is configured for use with a particular type of standard plug layout which is used in the region where the vehicle is sold and operated. A typical cover or cap may be tethered to the outlet by a hinge, allowing the cover to snap on and off of the outlet. However, such a cover requires available adjacent space for its normal operation to avoid interference with other components or with portions of the trim panel itself. Moreover, a tether may be subject to breakage and might then become lost.

Vehicle manufacturers may produce particular models of vehicle for sale in different regions which have different configuration requirements. For example, power outlets for AC inverters may need to conform to different plug configurations used in different regions. Making two slightly different versions of the same vehicle model results in associated financial outlays, but are typically much less than making two completely different vehicle models for the two regions. Nevertheless, minimizing the impacts of different regional requirements is desirable for production efficiency and financial considerations.

More specifically, a North American version of a particular model of vehicle may include an AC power outlet configured with a plug/socket layout as defined by NEMA (e.g., a NEMA 5-15 layout), which is also defined as a Type B plug by the International Trade Administration. A European version of the same vehicle may have the power outlet configured with a plug/socket layout according to Type G or Type C as defined by the International Trade Administration or the Europlug as defined by the International Electrotechnical Commission. Conventionally, the power outlet cannot use a common component across all the worldwide versions of the vehicle model which results in increased financial outlays for design, development, and testing.

SUMMARY OF THE INVENTION

The present invention provides a coverless AC outlet with a pivotable faceplate that selectably covers or exposes the terminals. Internal terminals may be packaged in a cylinder which is interchangeable between different plug styles (e.g., US or European style plugs). An integrated switch or sensor generates a control signal according to the faceplate position. Surrounding the faceplate, a ring of light indicates status of activated or non-activated terminals. Most of the components of the AC outlet are compatible with the vehicle designs for versions of the vehicle intended for respective regions, especially including the components which physically interface to other parts of the vehicle such as the structures to which the AC outlet is mounted. The AC outlet also includes an interchangeable portion which is configured to match a respective one of the regions. The non-interchangeable portion of the AC outlet is configured to mate with each of the different interchangeable portions without modification.

In one aspect of the invention, a vehicle power outlet comprises a housing defining a recess and a circuit substrate disposed at a bottom of the recess. The power outlet has an inner bezel and a plurality of power terminals affixed to the inner bezel each having an outer end adapted to receive a power plug of a load device and having an inner end configured for connecting to a power source via the circuit substrate. An outer bezel nests together with the inner bezel, wherein the outer bezel defines a fixed faceplate mounted in alignment with the power terminals and having fixed openings guiding the power plug to be inserted into the power terminals. Control terminals are carried by the housing and defining forward contact surfaces at fixed positions. The power outlet has a front trim panel. A rotatable faceplate is disposed between a front side of the fixed faceplate and a rear side of the front trim panel. The rotatable faceplate has movable openings for selectably covering and uncovering the fixed openings in the fixed faceplate. The rotatable faceplate comprises a conductive element configured to complete an electrical connection between the control terminals when the rotatable faceplate is in a predetermined position.

DETAILED DESCRIPTION OF PREFERRED EMBODIMENTS

Figure 2:
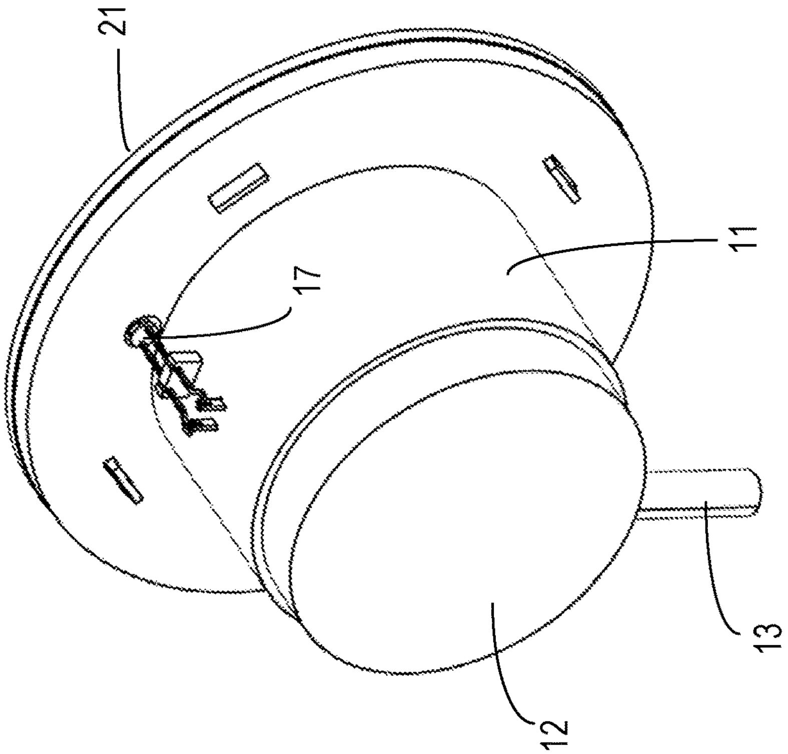
FIG. 2 is a rear, perspective view of the power outlet of FIG. 1.
Figure 1:
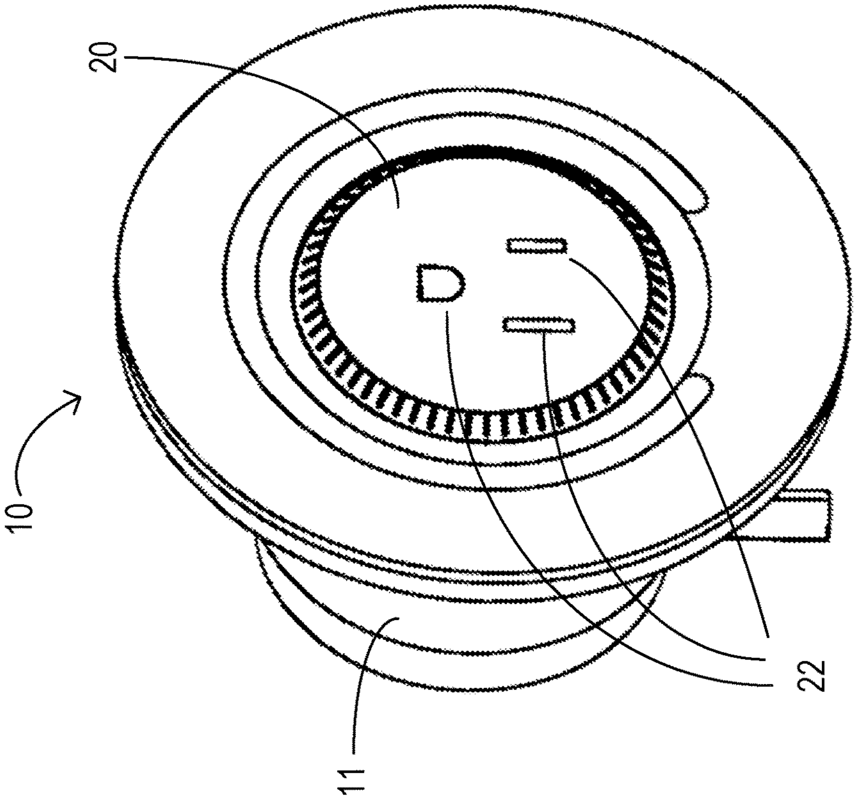
FIG. 1 is a front, perspective view of a first embodiment of a power outlet having a North American style outlet.
Figure 3:
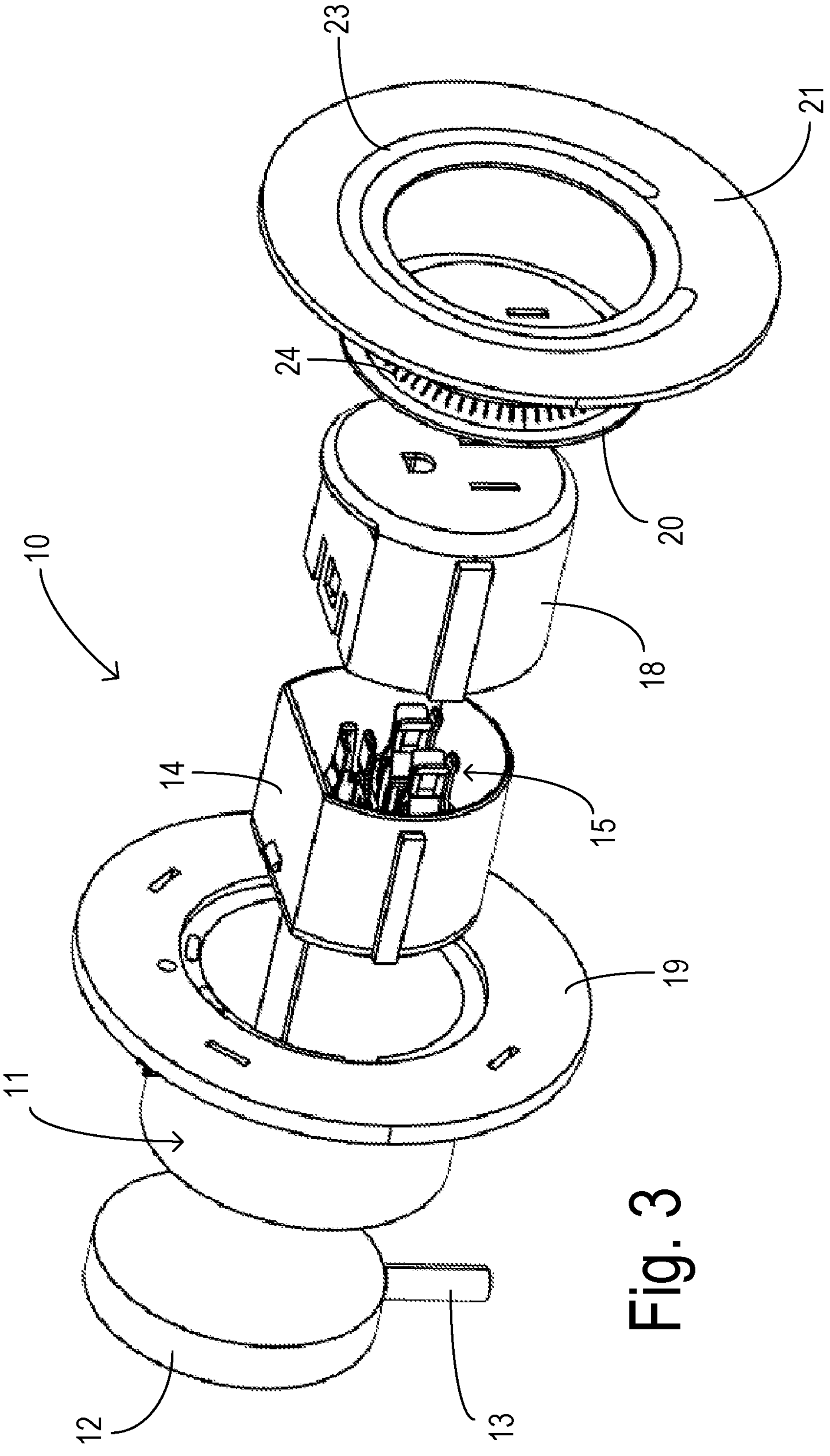
FIG. 3 is an exploded view of the power outlet of FIG. 1.
Figure 5:
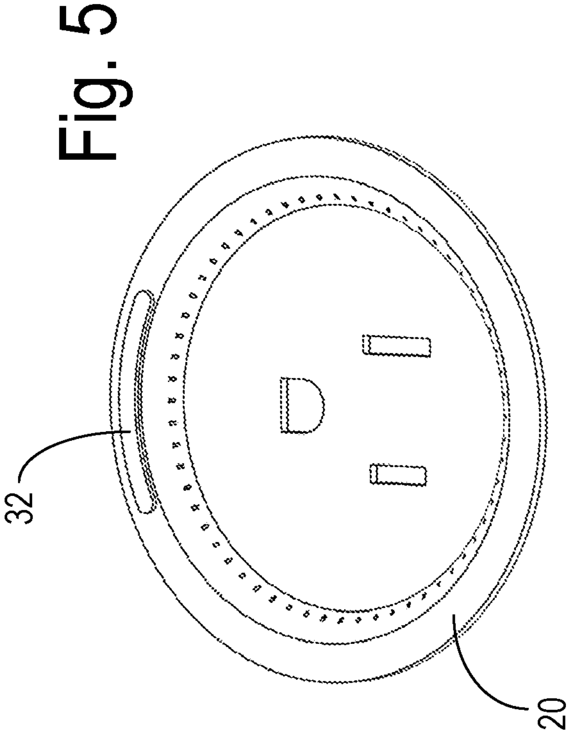
FIG. 5 shows a rear perspective view of the rotatable faceplate of FIG. 1.

A first embodiment of a power outlet 10 is shown in FIGS. 1-11. Power outlet 10 has a cup-shaped housing 11 and a circuit assembly or substrate 12 coupled to a wiring harness connector 13. A front trim panel or cover 21 attaches to a front flange 19 of housing 11 to retain a rotatable faceplate of an interchangeable outlet module which is configurable to any particular outlet style and which interfaces with connection points on circuit substrate 12 to transfer AC power. The interchangeable outlet module comprises an inner bezel 14, power terminals 15, an outer bezel 18, and a rotatable faceplate 20. Inner bezel 14 is cup-shaped and has retaining beams to align and hold power terminals 15 in an orientation to capture prongs of a power cord plugged into outlet 10 at their forward ends. The rearward ends of power terminals 15 extend through holes in inner bezel 14 to connect with the connection points on circuit substrate 12. Outer bezel 18 is cup-shaped and fits over inner bezel 14, and the nested bezels are inserted into guide slots in housing 11. A front wall of outer bezel 18 provides an internal, fixed faceplate with openings in alignment with power terminals 15 to allow the prongs of a power cord to pass through. Rotatable faceplate 20 is rotatably captured between outer bezel 18 and cover 21. Faceplate 20 may be saucer-shaped with a center portion extending forward through a central opening in cover 21. The raised portion may preferably include gripping protrusions 24 for receiving a turning force applied manually by a user to rotatable faceplate 20. Gripping protrusions 24 may be comprised of raised ridges. Rotatable faceplate 20 has openings 22 which can be manually rotated into alignment with the openings in fixed faceplate 18 when it is desired to utilize power outlet 10. When a power plug for an AC load device is not plugged in, rotatable faceplate 20 can be manually rotated to a position where the openings are not aligned, thereby preventing access to power terminals 15.

Housing 11 also carries a pair of control terminals 16 and a multi-colored LED 17 which extends into an aperture in flange 19. Cover 21 includes a translucent insert 23 which diffuses light from LED 17 in a ring which is used to indicate when AC power is activate and to signal other status information. Other lighting arrangements and/or light sources can also be used. Circuit substrate 12 may be comprised of a printed circuit board carrying integrated circuits, wiring, and other electronic components for transferring power and communications, operating LED 17, and detecting a rotational position of faceplate 20 as described below.

Figure 6:
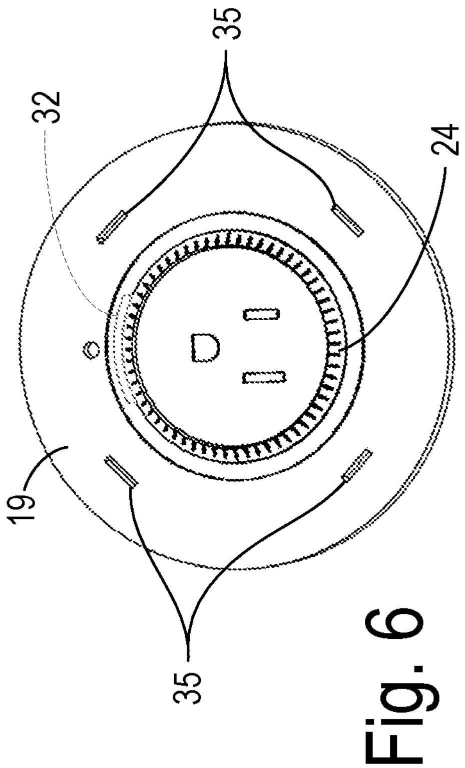
FIG. 6 shows a front view of the rotatable faceplate on the housing.

For detecting an operating position of power outlet 10, control terminals 16 have exposed pads 30 and 31 (FIG. 4) arranged on a surface of housing 11 on which rotatable faceplate 20 rotates. A rear side of rotatable faceplate 20 carries a conductive bridge pad 32 (FIGS. 5 and 7) for making electrical contact between pads 30 and 31 when faceplate 20 is in a position to expose the plug holes in fixed faceplate 18. In any other positions, no contact is made between pads 30 and 31. FIG. 6 shows the orientation of pad 32 (in hidden lines) bridging pads 30 and 31 when the plug holes are aligned. Control terminals 16 connect to circuit substrate 12 where circuitry detects an electrically coupled or uncoupled state of pads 30 and 31.

Figure 7:
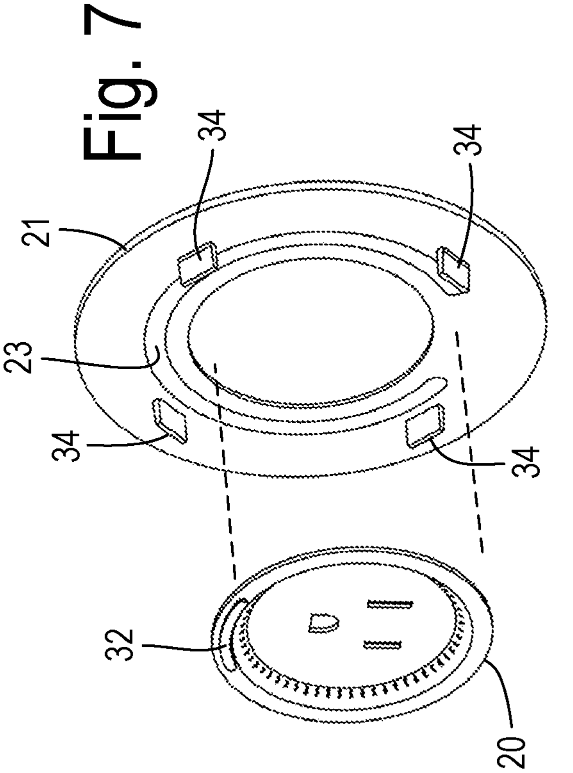
FIG. 7 shows a side perspective view of the rotatable faceplate and front trim panel of FIG. 1.
Figure 4:
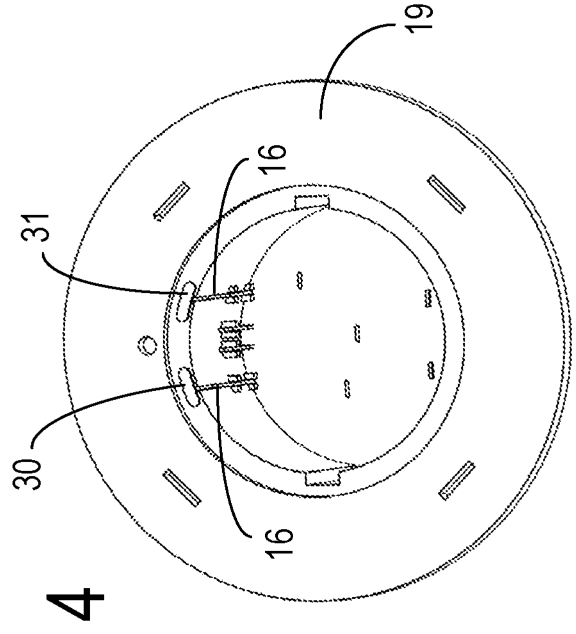
FIG. 4 shows a front perspective view of the housing of FIG. 1.
Figure 9:
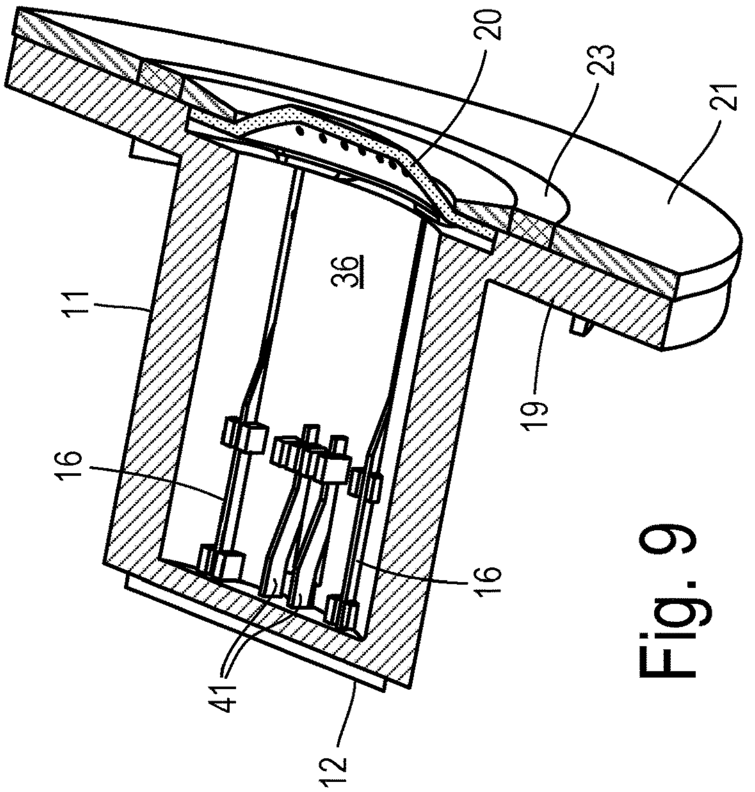
FIGS. 8 and 9 are cross-sectional views of the power outlet of FIG. 1 without the bezels or power terminals.
Figure 8:
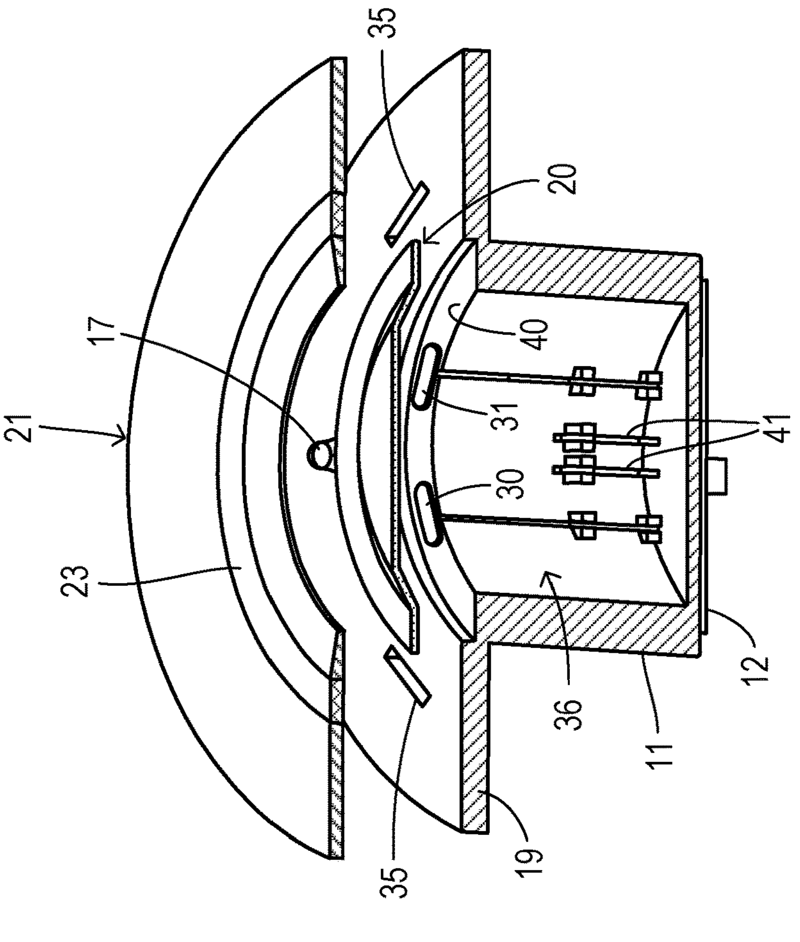
Figure 11:
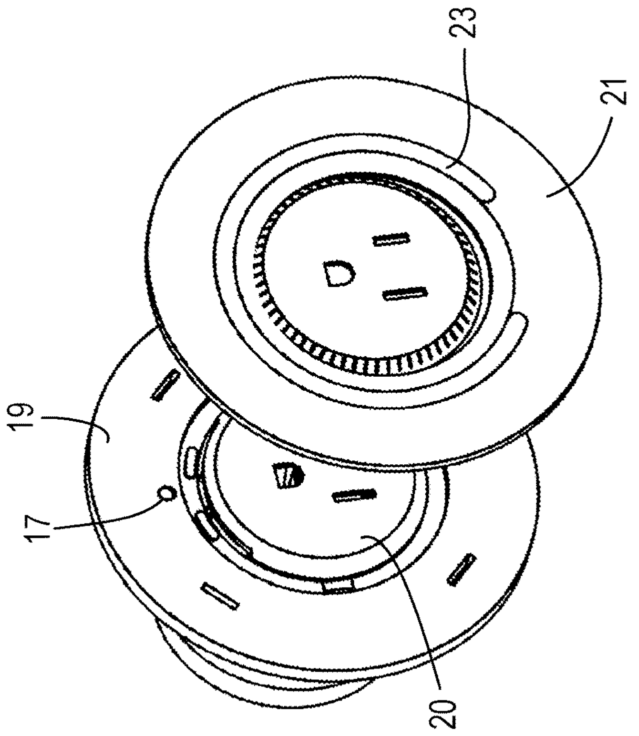
FIGS. 10 and 11 are partially exploded views with the rotatable faceplate and front trim panel unattached so that the interior recess of the housing is accessible.
Figure 10:
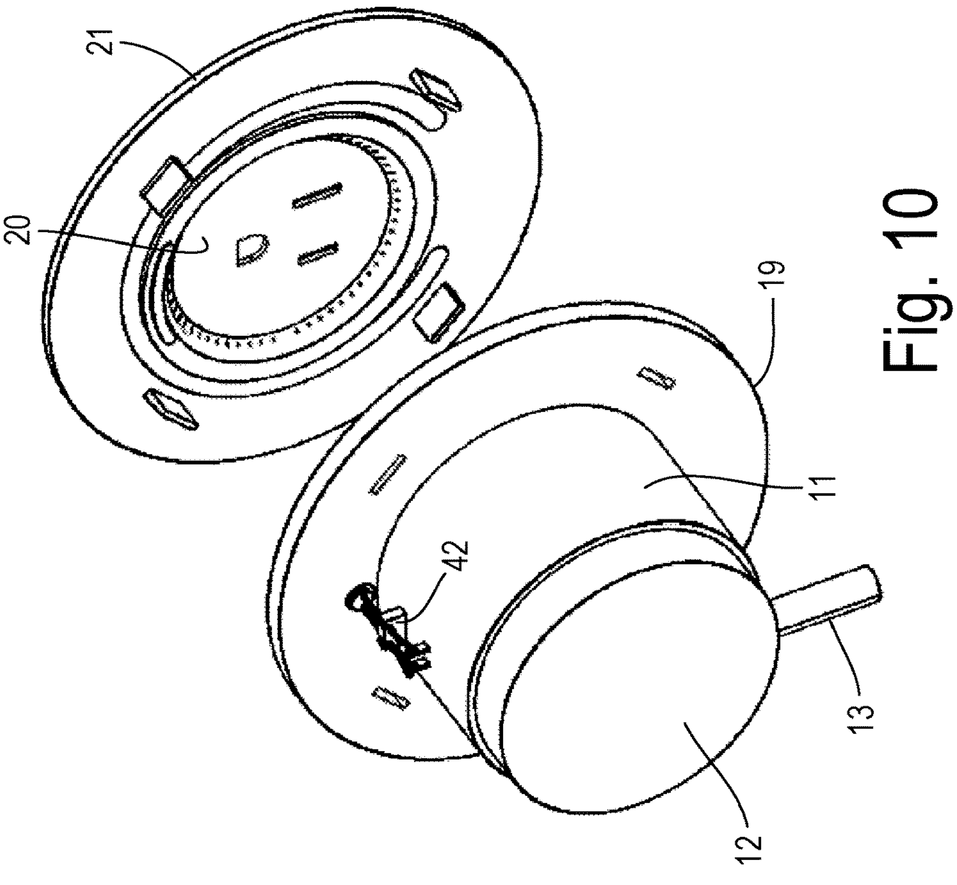

As shown in FIGS. 6 and 7, a rear side of trim panel cover 21 is molded to include tab projections 34 which are configured for insertion into slots 35 in flange 19 of housing 11. To retain the interchangeable module, projections 34 and slots 35 may be dimensioned to provide a press fit, or projections 34 can be heat staked, for example. FIGS. 8 and 9 show the positioning of rotatable faceplate 20 in a channel 40 formed at an inner periphery of flange 19. Faceplate 20 is sandwiched between the rear side of cover 21 and a circular shelf formed by channel 40. Pads 30 and 31 are exposed at the surface of channel 40. FIGS. 8 and 9 further show a recess 36 in housing 11 which has integral clips for mounting control terminals 16 and conductor bars 41 which extend through housing 11 to connect with LED 17. As shown in FIG. 10, an exterior side of housing 11 may include a mounting block 42 for supporting integral leads of LED 17 between flange 19 and a soldered connection of the integral leads with conductor bars 41.

Figure 13:
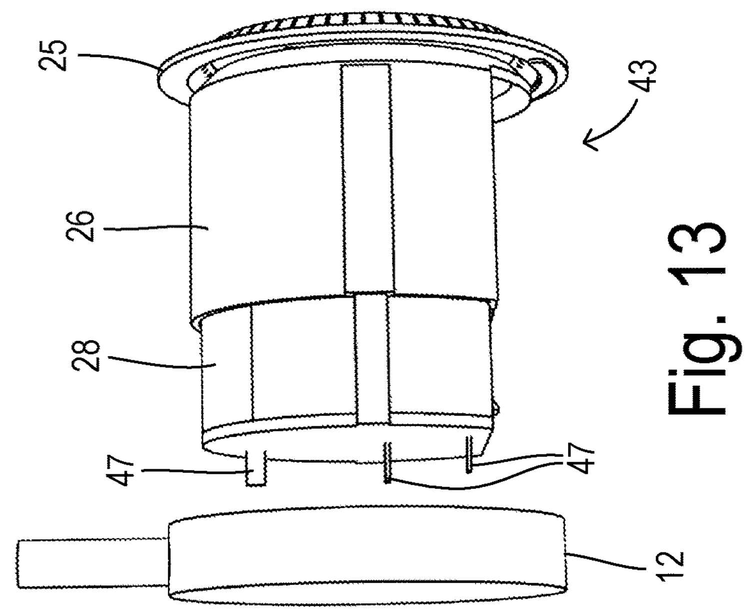
FIG. 13 shows a partially exploded side view of a power outlet having the European style outlet and with the housing removed.
Figure 12:
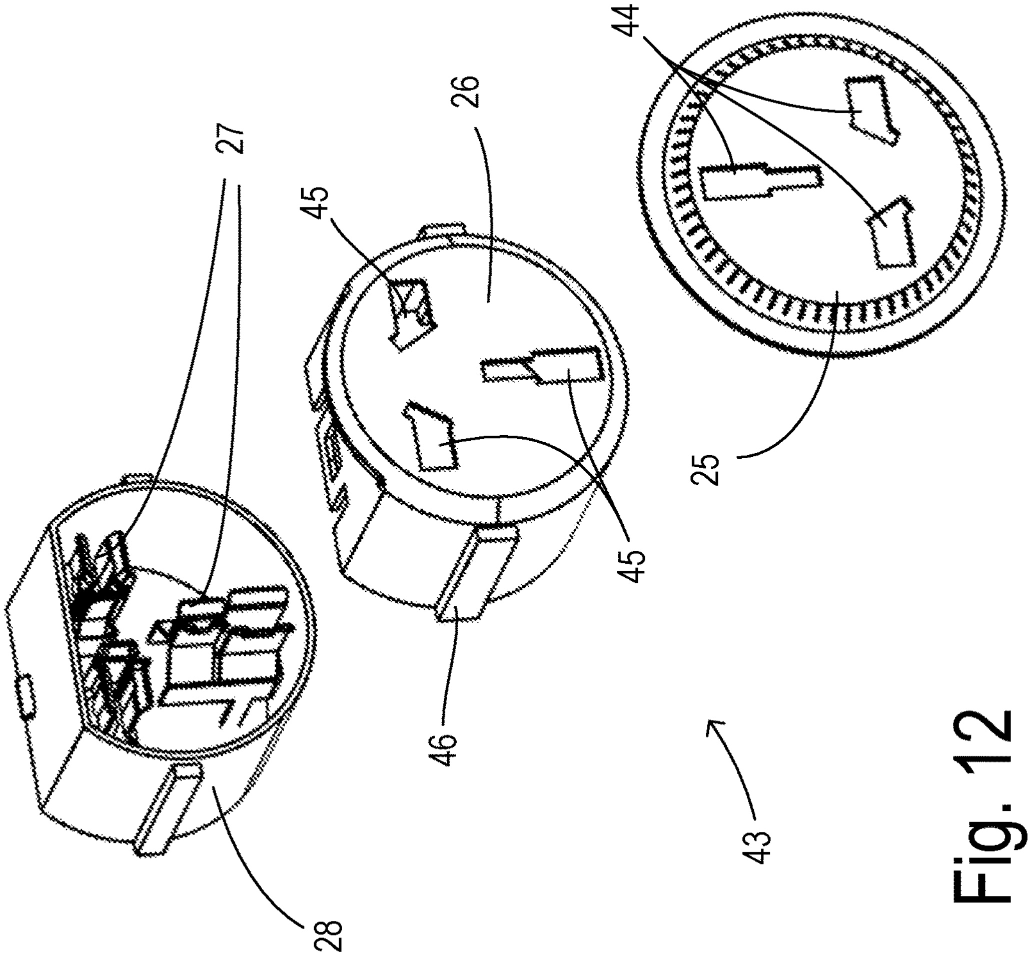
FIG. 12 is an exploded view of an interchangeable module portion of the power outlet for an embodiment having a European style outlet.
Figure 18:
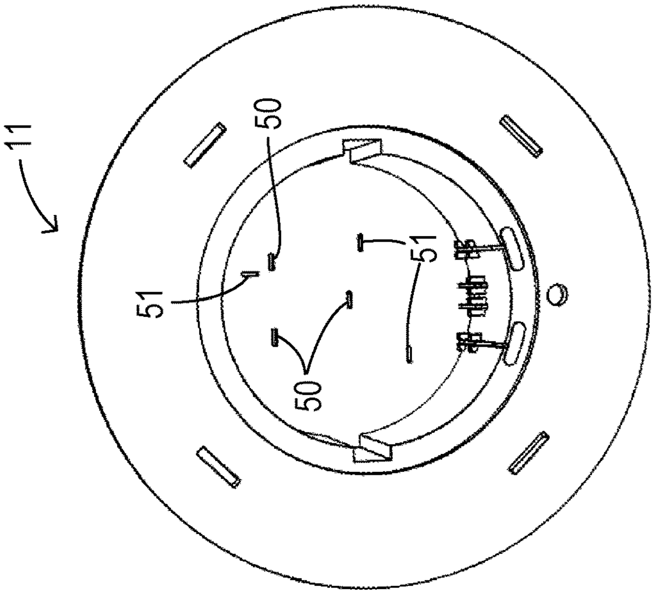
FIG. 18 shows a perspective view of the housing with apertures at the bottom of the recess configured to interchangeably receive power terminals for either the North American style outlet or the European style outlet.
Figure 15:
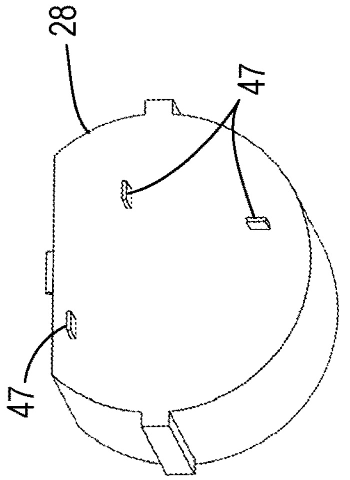
FIGS. 14 and 15 are front and rear perspective views, respectively, of the inner bezel of the European style outlet of FIG. 12.
Figure 17:
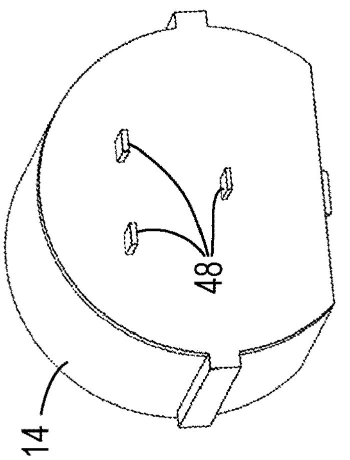
FIGS. 16 and 17 are front and rear perspective views, respectively, of the inner bezel of the North American style outlet shown in FIG. 3.
Figure 14:
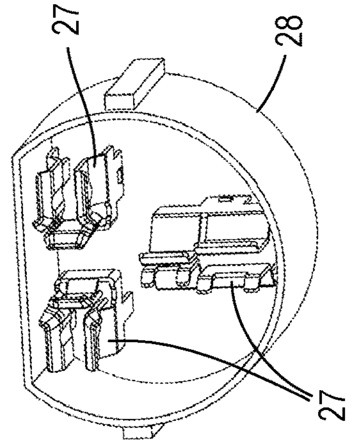
Figure 16:
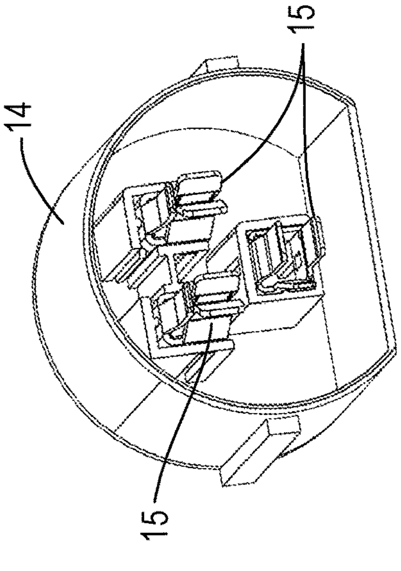
Figure 20:
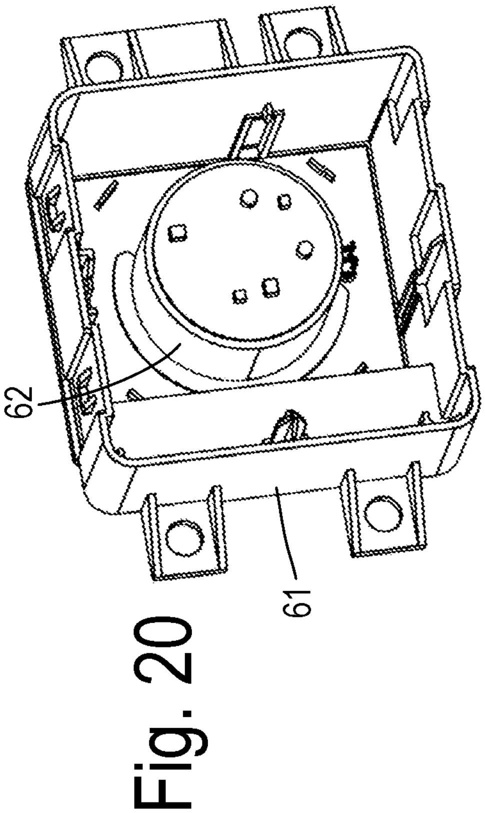
FIGS. 19 and 20 are front and rear views, respectively, of an interchangeable power outlet system according to a further embodiment.
Figure 21:
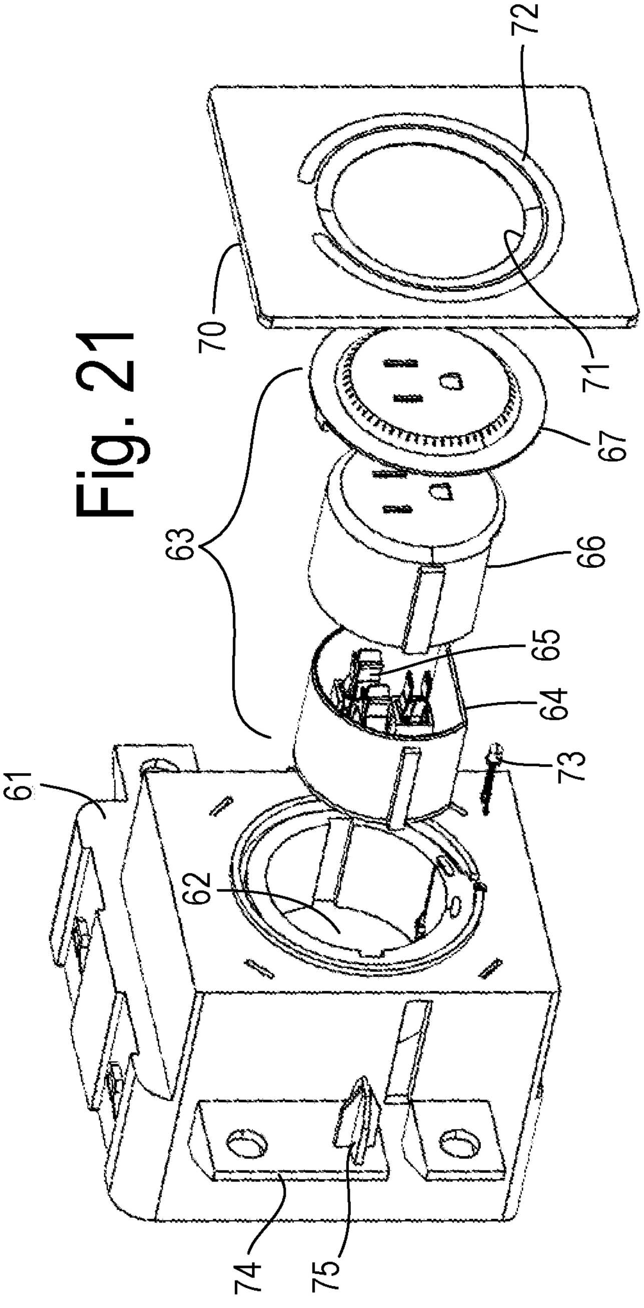
FIG. 21 is an exploded view of the power outlet of FIG. 19.
Figure 19:
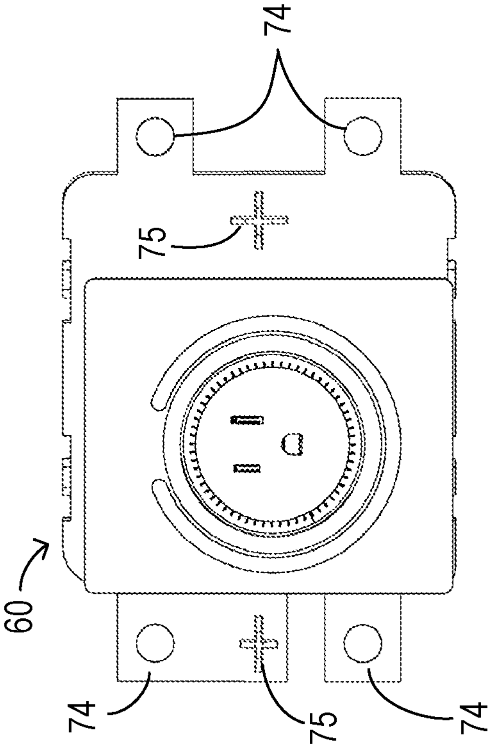

The first embodiment described above is shown in a configuration according to a US standard for AC plugs. For other types of plugs, a minimal number of different parts can be interchanged in order to accommodate other standards. FIG. 12 shows a second embodiment of an interchangeable module 43 configured for European (EU) standard plugs. A rotatable faceplate 25 has a same overall footprint as faceplate 20 (e.g., for rotating in channel 40 of housing 11), but has plug openings 44 conforming to an EU standard. An outer bezel 26 is cup-shaped and has a front wall providing a fixed faceplate with fixed openings 45 with an EU standard placement in alignment with internal power terminals 27 which are mounted in a cup-shaped inner bezel 28. Side walls of bezels 26 and 28 may have a D-shaped profile so that they are non-rotational when nested together. Outer bezel 26 has side rails 46 which slide into matching elongated slots in housing 11 so that the bezel does not rotate within housing 11. As shown in FIG. 13, power terminals 27 have inner ends 47 extending through holes in a bottom wall of inner bezel 28 in alignment with connection points on circuit substrate 12 corresponding to the layout for the EU style interchangeable module. FIGS. 14 and 15 show inner ends 47 corresponding to the arrangement of power terminals 27. FIGS. 16 and 17 show inner ends 48 of power terminals 15 in the arrangement for the interchangeable module of the North American style outlet. As shown in FIG. 18, passthrough holes are provided in housing 11 to accommodate either outlet style. Holes 50 receive inner ends 48 so that power terminals 15 can join with corresponding connection points for power delivery according to a North American standard. Holes 51 receive inner ends 47 so that power terminals 27 can join with corresponding connection points for power delivery according to a European standard. Interchangeable modules can be configured for any other standards or even any nonstandard arrangement.

Circuitry in circuit assembly 12 can monitor continuity between pads 30 and 31 to detect the position of faceplate 20. When the active position is detected, LED 17 can be powered on. Further, the power inverter could be controlled (e.g., turned on or off) in response to the faceplate position. The color and/or a steady or blinking pattern of the illumination from LED 17 can be used to indicate other status information such as an operating error.

Another embodiment of a power outlet 60 is shown in FIGS. 19-22 wherein an outlet control box 61 is utilized as a housing for the power outlet and for other components (such as control or power circuits). Box 61 can be shaped to interface with any other trim components or trim panels, enabling an outlet to be seamlessly integrated into a vehicle interior. Box 61 forms a cup 62 for receiving an interchangeable module 63. Mounting tabs 74 and alignment posts 75 are provided on box 61 for fastening power outlet 60 in the vehicle interior. A front trim panel 70 mounts to a front side of box 61.

Interchangeable module 63 comprises an inner bezel 64, power terminals outer bezel 66, and rotatable faceplate 67. Front trim panel 70 has an aperture 71 for receiving a raised center portion of faceplate 67 such that module 63 is retained in cup 62 by panel 70 which attached to a front end of box 61. A light transmissive insert 72 in panel 70 is aligned with an LED 73 for signaling purposes.

In the prior embodiments (FIGS. 1-18), the rotatable faceplate may be able to rotate continuously over 360° of rotation. It may be desired to limit the rotation of the faceplate (e.g., restricted to 180° or any other desired angle or range) for ease of use. For example, the rotatable faceplate may include a pin or other feature that slides within a grooved path in the housing.

Figure 22:
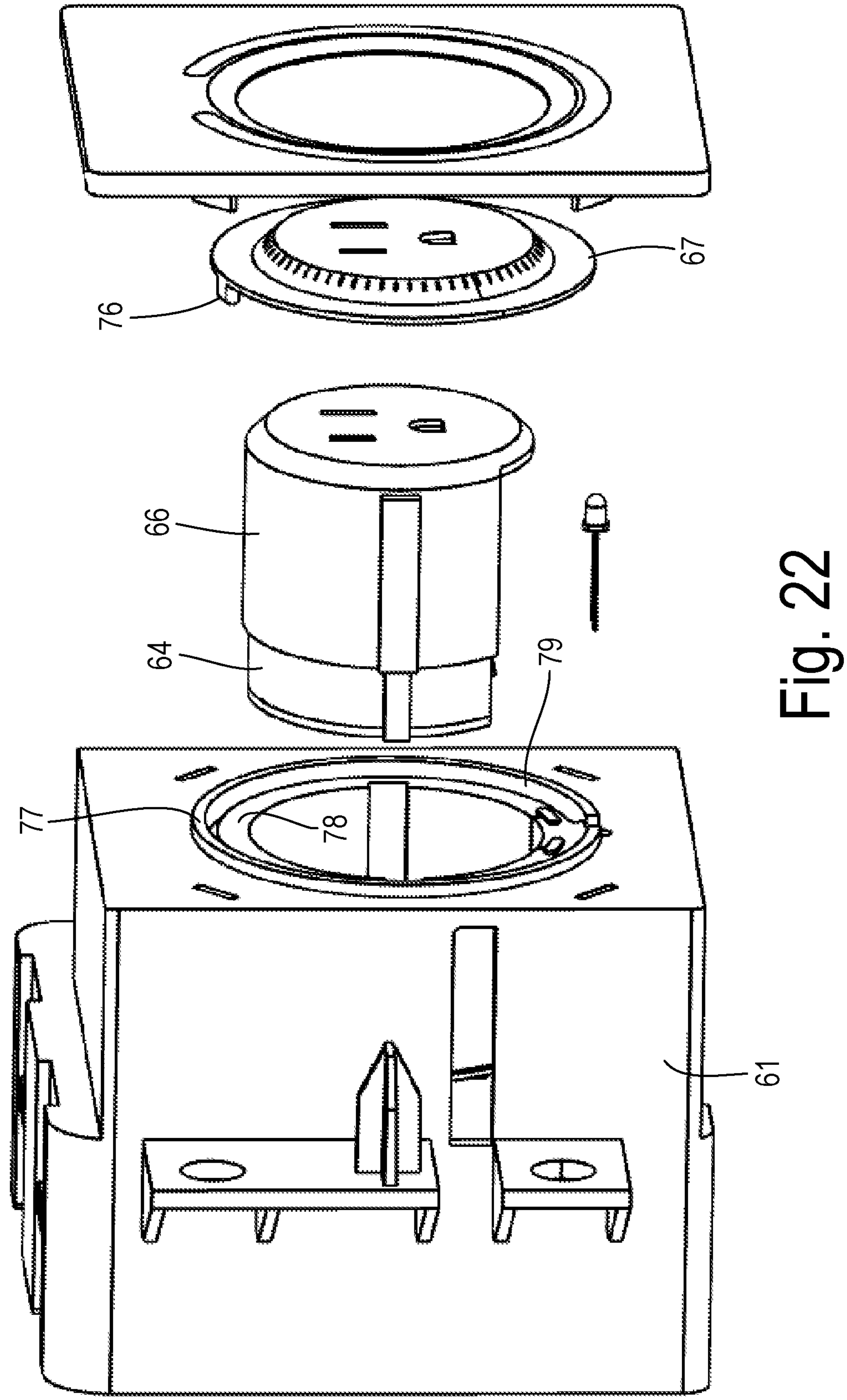
FIG. 22 depicts a housing and rotatable faceplate for another embodiment wherein rotation of the rotatable faceplate in restricted to prescribed angles.

As shown in FIG. 22, rotatable faceplate 67 has a projecting pin 76. Box 61 has a collar 77 extending forward from its front side, and a channel shelf 78 receives a rear side of faceplate 67. A sunken groove 79 extends around a portion of the perimeter of shelf 78 and receives pin 76. Groove 79 is configured to allow faceplate 67 to rotate along an arc which at one end of the arc corresponds to alignment of movable plug holes on faceplate 76 with fixed plug holes on outer bezel 66. When at this end of the arc, the control pads are bridged by a conductive pad on faceplate 67 so that the inverter can be turned on.

Figure 23:
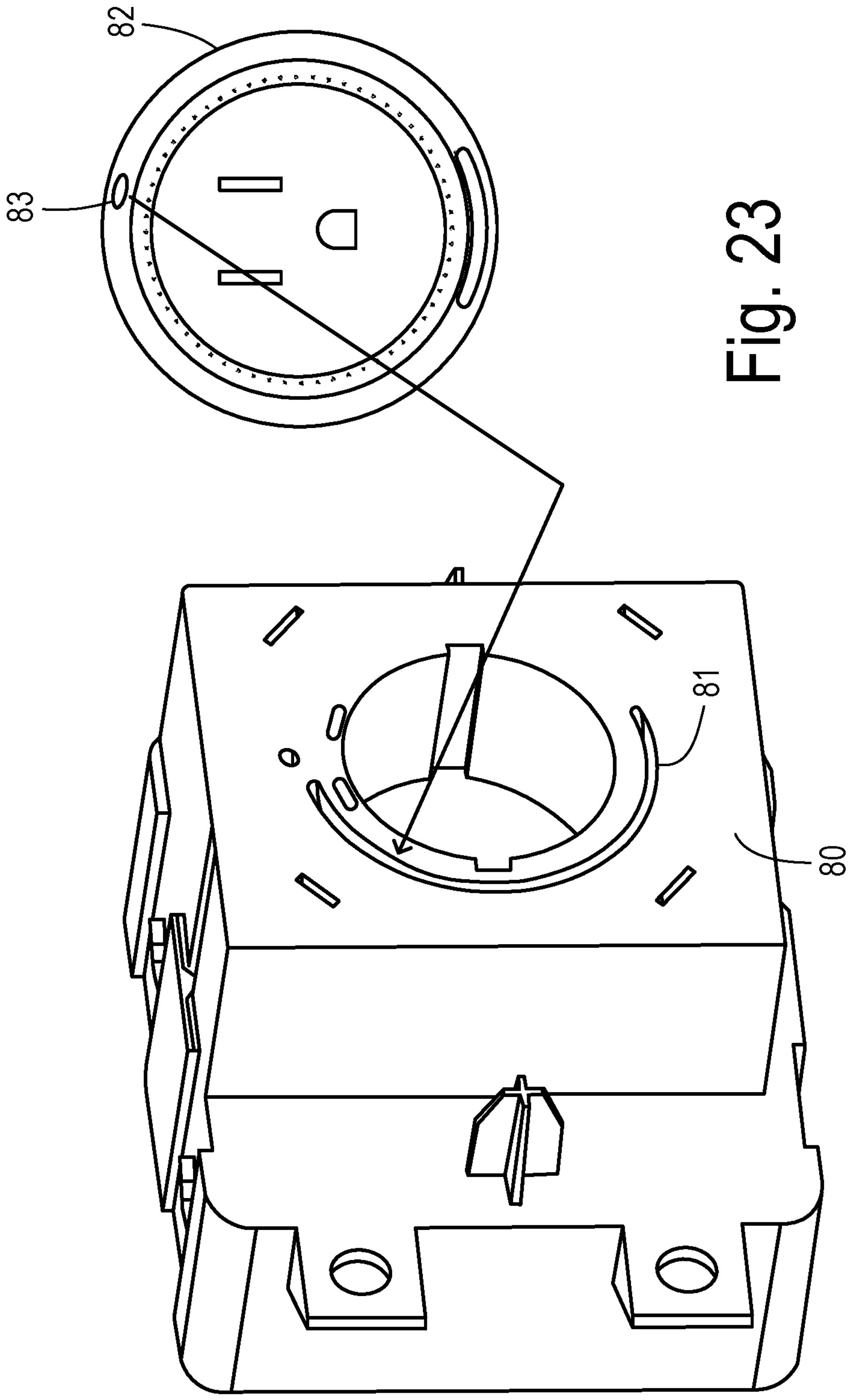
FIG. 23 is an exploded view of a power outlet according to yet another embodiment wherein rotation of the rotatable faceplate in restricted to prescribed angles.

FIG. 23 shows another embodiment with restricted rotation. A box 80 includes an arcuate channel 81 disposed around a recess for receiving an interchangeable module. A faceplate 82 has a projecting pin 83 on its rear side for insertion into groove 81.

Figure 24:
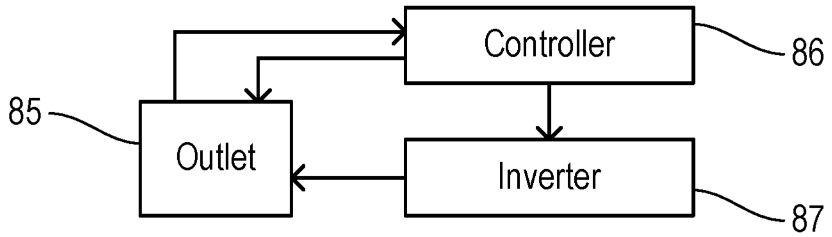
FIG. 24 is a block diagram for a power outlet system.

FIG. 24 shows a vehicle system incorporating a power outlet 85 of the present invention. Circuitry on a circuit substrate in power outlet 85 connects to a vehicle electronic controller 86. Controller 86 monitors a position of the rotatable faceplate of outlet 85 according to whether a conductive element (e.g., bridge pad) on the faceplate completes an electrical connection between control terminals on an outlet housing when the rotatable faceplate is in a predetermined position. An inverter 87 supplies AC power to power terminals in outlet 85 in response to control signals from controller 86. Controller 86 selectably illuminates an LED in power outlet 85 to indicate an on/off status of inverter 87 and/or other status conditions or faults.

Figure 25:
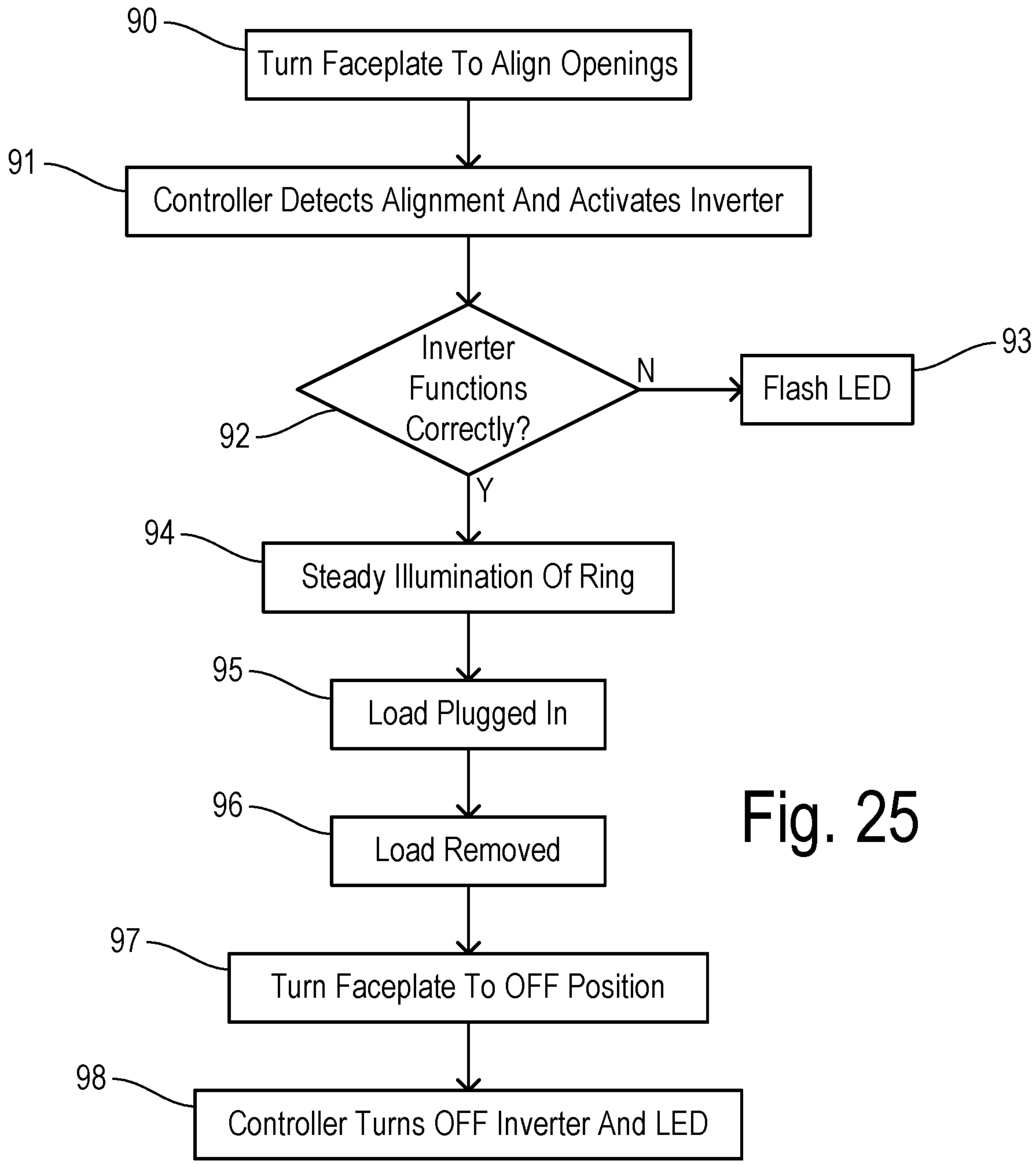
FIG. 25 is a flowchart showing an example method of using the power outlet.

FIG. 25 shows a user method for operating a power outlet. In step 90, a user wanting to obtain AC power for an AC load device (e.g., having an AC plug according to a plug style of the interchangeable module) turns the rotatable faceplate into a rotational position which aligns plug openings in the rotatable faceplate and the fixed faceplate of the outer bezel so that power terminals mounted in the inner bezel can receive the power plug. The controller detects the aligned condition in step 91 and activates the AC inverter to supply AC power to the power outlet.

A check is performed in step 92 by the controller to determine whether the inverter is functioning correctly. If not, then the LED is flashed in step 93 and the inverter may be shut down. A particular type of error may be identified by the controller, and a corresponding LED light pattern may convey the type of error so that a user can obtain service to correct the error condition.

When the inverter functions correctly, the LED provides steady illumination in step 94 to indicate to the user that AC power is available from the outlet. The user then plugs in an AC load device in step 95. When use of the load device is completed, the user removes the AC plug in step 96 and then turns the rotatable faceplate back to an unaligned position (i.e., OFF position) in step 97. Then the controller commands the inverter to stop providing power in step 98, and it simultaneously turns off the LED.

What is claimed is:

1. A vehicle power outlet comprising:

a housing defining a recess;

a circuit substrate disposed in the recess;

an inner bezel;

a plurality of power terminals affixed to the inner bezel each having an outer end adapted to receive a power plug of a load device and having an inner end configured for connecting to a power source via the circuit substrate;

an outer bezel which nests together with the inner bezel, wherein the outer bezel defines a fixed faceplate mounted in alignment with the power terminals and having fixed openings guiding the power plug to be inserted into the power terminals;

control terminals carried by the housing and defining forward contact surfaces at fixed positions;

a front trim panel; and a rotatable faceplate disposed between a front side of the fixed faceplate and a rear side of the front trim panel, wherein the rotatable faceplate has movable openings for selectably covering and uncovering the fixed openings in the fixed faceplate, and wherein the rotatable faceplate comprises a conductive element configured to complete an electrical connection between the forward contact surfaces of the control terminal when the rotatable faceplate is in a predetermined position.

2. The vehicle power outlet of claim 1 wherein the inner bezel, the power terminals, and the outer bezel are configured as a first interchangeable module conforming to a first outlet standard, wherein the circuit substrate defines first connection points aligned to receive the inner ends of the power terminals, and wherein the circuit substrate is adapted to connect to a second interchangeable module comprised of a second inner bezel, second power terminals, and second outer bezel conforming to a second outlet standard, and wherein the circuit substrate defines second connection points aligned to receive second inner ends of the second power terminals of the second interchangeable module.

3. The vehicle power outlet of claim 2 wherein the movable openings of the rotatable faceplate and the fixed openings of the outer bezel match the first outlet standard, and wherein a space between the front trim panel and the outer bezel receiving the rotatable faceplate is configured to interchangeably receive the rotatable faceplate with movable openings matching the first outlet standard or a second rotatable faceplate having second movable openings matching the second outlet standard.

4. The vehicle power outlet of claim 1 wherein the contact surfaces of the control terminals are disposed on a sliding surface of the housing which receives the rotatable faceplate, wherein the control terminals define contact pads at the sliding surface, and wherein the conductive element on the rotatable faceplate bridges the contact surfaces when the movable openings on the rotatable faceplate uncover the fixed openings on the fixed faceplate and otherwise do not bridge the contact surfaces.

5. The vehicle power outlet of claim 1 further comprising:

a light emitter configured to emit controllable illumination through the front trim panel in response to an activation or deactivation of the power outlet determined according to whether the conductive element bridges the contact surfaces.

6. The vehicle power outlet of claim 5 wherein the front trim panel includes a light transmissive zone aligned with the light emitter.

7. The vehicle power outlet of claim 6 wherein the light transmissive zone is arranged as a ring along at least a portion of a perimeter of the rotatable faceplate.

8. The vehicle power outlet of claim 1 wherein a front surface of the rotatable faceplate includes a plurality of gripping protrusions for receiving a turning force applied manually to the rotatable faceplate.

9. The vehicle power outlet of claim 1 wherein the housing and the front trim panel define complementary features for snapping together and capturing the inner bezel, outer bezel, and rotatable faceplate therebetween.

10. The vehicle power outlet of claim 1 wherein the housing defines an arcuate groove, wherein the rotatable faceplate defines a pin configured to insert into the arcuate groove, wherein the arcuate groove and pin are configured to limit rotation of the rotatable faceplate to a range between an uncovered state of the fixed openings and a covered state of the fixed openings, and wherein the range is less than or equal to about 190° of rotation.

11. An interchangeable power outlet system for vehicles, comprising:

a housing defining a recess;

a circuit substrate disposed in the recess;

control terminals carried by the housing and defining forward contact surfaces at fixed positions;

a front trim panel fastened to the housing and having an outlet aperture; and an interchangeable module disposed in the recess and aligned with the outlet aperture, wherein the interchangeable module comprises:

an inner bezel;

a plurality of power terminals affixed to the inner bezel each having an outer end adapted to receive a power plug of a load device and having an inner end configured for connecting to a power source via the circuit substrate;

an outer bezel which nests together with the inner bezel, wherein the outer bezel defines a fixed faceplate mounted in alignment with the power terminals and having fixed openings guiding the power plug to be inserted into the power terminals; and a rotatable faceplate disposed in the outlet aperture and held between a front side of the fixed faceplate and a rear side of the front trim panel, wherein the rotatable faceplate has movable openings for selectably covering and uncovering the fixed openings in the fixed faceplate, and wherein the rotatable faceplate comprises a conductive element configured to complete an electrical connection between the forward contact surfaces of the control terminals when the rotatable faceplate is in a predetermined position;

wherein the interchangeable module is selectably configured as a first interchangeable module conforming to a first outlet standard or as a second interchangeable module conforming to a second outlet standard, wherein the circuit substrate defines first connection points aligned to receive the inner ends of the power terminals of the first interchangeable module, and wherein the circuit substrate defines second connection points aligned to receive the inner ends of the power terminals of the second interchangeable module; and wherein the movable openings of the rotatable faceplate and the fixed openings of the outer bezel match the first outlet standard when the interchangeable module conforms to the first outlet standard, and wherein the movable openings of the rotatable faceplate and the fixed openings of the outer bezel match the second outlet standard when the interchangeable module conforms to the second outlet standard.

12. The interchangeable power outlet system of claim 11 wherein the contact surfaces of the control terminals are disposed on a sliding surface of the housing which receives the rotatable faceplate, wherein the control terminals define contact pads at the sliding surface, and wherein the conductive element on the rotatable faceplate bridges the contact surfaces when the movable openings on the rotatable faceplate uncover the fixed openings on the fixed faceplate and otherwise do not bridge the contact surfaces.

13. The interchangeable power outlet system of claim 11 further comprising:

a light emitter configured to emit controllable illumination through the front trim panel in response to an activation or deactivation of the power outlet determined according to whether the conductive element bridges the contact surfaces.

14. The interchangeable power outlet system of claim 13 wherein the front trim panel includes a light transmissive zone aligned with the light emitter.

15. The interchangeable power outlet system of claim 14 wherein the light transmissive zone is arranged as a ring along at least a portion of a perimeter of the rotatable faceplate.

* * * * *